(12) United States Patent
Uchida et al.

(10) Patent No.: US 7,580,593 B2
(45) Date of Patent: Aug. 25, 2009

(54) OPTICAL ATTENUATOR

(75) Inventors: Yuichi Uchida, Hirakata (JP); Nobuyuki Miyagawa, Takatsuki (JP); Tadahiro Yamaji, Hirakata (JP); Takuya Matsumoto, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 0 days.

(21) Appl. No.: 12/278,428

(22) PCT Filed: Mar. 22, 2007

(86) PCT No.: PCT/JP2007/000281

§ 371 (c)(1),
(2), (4) Date: Aug. 6, 2008

(87) PCT Pub. No.: WO2007/122789

PCT Pub. Date: Nov. 1, 2007

(65) Prior Publication Data

US 2009/0103883 A1    Apr. 23, 2009

(30) Foreign Application Priority Data

Mar. 24, 2006 (JP) .............................. 2006-084016
Oct. 19, 2006 (JP) .............................. 2006-285188

(51) Int. Cl.
*G02F 1/035* (2006.01)
*G02F 1/295* (2006.01)
*G02B 6/26* (2006.01)
*G02B 6/42* (2006.01)
*G02B 6/10* (2006.01)
*G02B 6/00* (2006.01)

(52) U.S. Cl. .................. 385/2; 385/8; 385/15; 385/129; 385/140

(58) Field of Classification Search ...................... 385/2, 385/8, 15, 129, 140
See application file for complete search history.

(56) References Cited

U.S. PATENT DOCUMENTS

2002/0176687 A1* 11/2002 Diemeer et al. ............. 385/140

FOREIGN PATENT DOCUMENTS

JP    2004-325601    11/2004

(Continued)

OTHER PUBLICATIONS

English language Abstract of JP 2004-325601, Nov. 18, 2004.

(Continued)

*Primary Examiner*—Frank G Font
*Assistant Examiner*—Jerry Blevins
(74) *Attorney, Agent, or Firm*—Greenblum & Bernstein P.L.C.

(57) ABSTRACT

In an optical attenuator, there are a first optical waveguide 3A connected to an input optical waveguide 1, a second optical waveguide 3B connected to an output optical waveguide 2 and a connecting optical waveguide 4, which are connected with each other in series. A first recess 13A and a second recess 13B are formed in a positional relationship of opposite directions with respect to an axial direction of an optic axis of light that is inputted through the input optical waveguide 1, transmitted through the first optical waveguide 3A, the connecting optical waveguide 4 and the second optical waveguide 3B and outputted from the output optical waveguide 2. Further, a first optical attenuating heater 6A and a second optical attenuating heater 6B are arranged so as to produce opposite refractive index distributions in the axial direction of the optic axis of the light that is inputted through the input optical waveguide 1, transmitted through the first optical waveguide 3A, the connecting optical waveguide 4 and the second optical waveguide 3B and outputted from the output optical waveguide 2, in the first optical waveguide 3A and the second optical waveguide 3B. The optical attenuator capable of reducing a polarization dependent loss for a desired optical attenuation is provided without utilizing an interference of lights.

12 Claims, 8 Drawing Sheets

FOREIGN PATENT DOCUMENTS

| | | |
|---|---|---|
| JP | 2004-325602 | 11/2004 |
| JP | 2004325601 A * | 11/2004 |
| JP | 2005-195840 | 7/2005 |

OTHER PUBLICATIONS

Tomljenovic-Hanic S et al., "New design for a variable attenuator based on a bent channel waveguide", Applied Physics B (Lasers and Optics) Springer-Verlag Germany, vol. B77, No. 1, Aug. 8, 2003, pp. 19-23, XP002444630.

English language Abstract of JP 2004-325602, Nov. 18, 2004.

English language Abstract of JP 2005-195840, Jul. 21, 2005.

* cited by examiner (a)

(b) (c)

(a)

(b)

(c)

OPTICAL ATTENUATOR

TECHNICAL FIELD

The present invention relates to an optical attenuator that can regulate optical power of propagated light since an optical waveguide in the attenuator is partially heated to change its refractive index distribution. Particularly, the invention relates to an optical attenuator favorable to WDM (Wavelength Division Multiplexing) communication or the like.

BACKGROUND ART

In a wavelength multiplexing communication system, conventionally, a thermo-optic type variable optical attenuator utilizing thermo-optic (TO) effect is known as an optical attenuator for regulating signal intensity with respect to each wavelength on use. This thermo-optic type variable optical attenuator changes refractive index distributions of an optical waveguide core and its circumferential cladding layer while heating a part of optical waveguide by a heater. Consequently, the optical attenuator attenuates intensity of light to be propagated.

As such "optical waveguide" type devices, there are known variable one variable optical attenuator adopting a thermo-optic method shown in Patent Citations 1 and 2 listed below, for attenuation directly and another variable optical attenuator utilizing interference of lights shown in Patent Citation 3.

The variable optical attenuator of Patent Citations 1 and 2 is constructed so as to directly diffuse or attenuate light by changing a refractive index of the circumference of an optical waveguide core by heat. In addition, the variable optical attenuator of Patent Citations 1 and 2 have an optical waveguide composed of a diffuse part for diffusing input light, an attenuating part for attenuating the light diffused by the diffuse part and a recess for attenuating the light furthermore. With this constitution, the optical attenuator has an asymmetrical-profiled optical waveguide throughout input and output. In the optical attenuator like this, mainly, the recess serves to attenuate light thereby enhancing the attenuator's attenuating effect for light. Referring to FIG. 1 etc. of Patent Citation 1, it is noted that the variable optical attenuator is provided, on both sides of the optical waveguide in a width direction thereof, with three heaters (corres. heaters 5, 6 and 7 in Patent Citation 1). These heaters are adapted so as to apply heat on both sides of the optical waveguide, thereby producing changes in the refractive index of the optical attenuator.

While, the variable optical attenuator of Patent Citation 3 has a function of attenuating light due to the changes in the refractive index by heating, as similar to Patent Citations 1 and 2. In this variable optical attenuator, input light is diverged to two routes of lights and thereupon, one route is heated to change a phase of the relevant light. Thereafter, when the lights in two routes are combined into one again, there is produced an optical interference due to this phase change. The variable optical attenuator can regulate the intensity of output light through the use of optical interference. Again, the variable optical attenuator of Patent Citation 3 comprises two optical attenuators connected in series, each of which utilizes a Mach-Zehnder interferometer. In the variable optical attenuator, there are both established a length of the optical waveguide connecting one optical attenuator with the other optical attenuator and a birefringence, so that its transmittance against a certain polarization component is maximized by the front optical attenuator, while the transmittance against another polarization component is minimized by the rear optical attenuator.

Patent Citation 1: Japanese Patent Laid-open Publication No. 2004-325601
Patent Citation 2: Japanese Patent Laid-open Publication No. 2004-325602
Patent Citation 3: Japanese Patent Laid-open Publication No. 2005-195840

DISCLOSURE OF INVENTION

Technical Problem

The variable optical attenuator disclosed in Patent Citations 1 and 2 has three heaters arranged in the circumference of an optical waveguide. However, the variable optical attenuator actually includes a heater having a high contributing rate on a change in the refractive index of the circumference of a core (e.g. the heater 5 in FIG. 1 of Patent Citation 1) and heaters having no high contributing rate (e.g. the heaters 6, 7 in FIG. 1 of Patent Citation 1), so that there is a possibility that the refractive index distribution becomes asymmetric due to heat. If the refractive index distribution becomes asymmetric in the width direction of an optical waveguide in the circumference of the core in this way, the polarization dependency of a light passing through an asymmetric area in terms of the refractive index is apt to grow larger. In case of reducing an optical attenuation, it is possible to reduce a electric power, whereby the polarization dependency can be lowered. However, if increasing the electric power in order to increase the optical attenuation, there is a tendency that a loss by the polarization dependency (Polarization Dependent Loss (PDL)) gets larger.

In the variable optical attenuator disclosed in Patent Citation 3 mentioned above, if controlling the optical attenuation through the use of optical phases, in other words, optical interference, it would be possible to force an end to an occurrence of the polarization dependent loss owing to the establishment of both a length of the optical waveguide between the optical attenuators and a birefringence. However, if controlling the optical attenuation through the use of a situation where the refractive index in the circumference of the core is changed by heat, it is impossible to reduce the polarization dependent loss. As for the variable optical attenuator of Patent Citation 3, in a manufacturing process of controlling the length of an optical waveguide connecting between the optical waveguides and in a manufacturing process of controlling the condition of birefringence, it is difficult to attain desired manufacturing accuracy in spite of severe management of the manufacturing condition and therefore, it is difficult to produce the variable optical attenuators of the same performance stably. Accordingly, this variable optical attenuator has problems of inferior yield ratio and elevated manufacturing cost in the manufacturing process.

Under the above-mentioned situation, an object of the present invention is to provide an optical attenuator that can reduce the polarization dependent loss to attain a desired optical attenuation without utilizing interference of lights.

Technical Solution

The present invention of claim 1 provides an optical attenuator that attenuates light inputted through an input optical waveguide and outputs the light from an output optical waveguide, in which a first optical waveguide connected to the input optical waveguide, a second optical waveguide connected to the output optical waveguide and a connecting optical waveguide connecting the first optical waveguide with the second optical waveguide are connected in series.

The first optical waveguide includes a first diffuse part which is formed so that an optical waveguide width thereof becomes broader as extending from the input optical waveguide toward the connecting optical waveguide, a first attenuating part which is interposed between the first diffuse part and the connecting optical waveguide and also formed so that an optical waveguide width of the first attenuating part becomes narrower as directing toward the connecting optical waveguide, a first recess which is arranged on one side of the first attenuating part in a width direction of an optical waveguide thereof and a first optical attenuating heater which is arranged on the other side of the first attenuating part having the first recess in a width direction of an optical waveguide of the first attenuating part and also arranged so as to overlap with a part of the first attenuating part in a thickness direction of the first optical waveguide. The second optical waveguide includes a second diffuse part which is formed so that an optical waveguide width thereof becomes broader as extending from the connecting optical waveguide toward the output optical waveguide, a second attenuating part which is interposed between the second diffuse part and the output optical waveguide and also formed so that an optical waveguide width of the second attenuating part becomes narrower as directing toward the output optical waveguide, a second recess which is arranged on one side of the second diffuse part in a width direction of an optical waveguide thereof or one side of the second attenuating part in a width direction of an optical waveguide thereof and a second optical attenuating heater which is arranged on the other side of the optical waveguide having the second recess in the width direction and also arranged so as to overlap with a part of the second diffuse part or the second attenuating part in a thickness direction of the second optical waveguide.

In the optical attenuator like this, in order to solve the above-mentioned problem, the first recess and the second recess are formed in a positional relationship of opposite directions with respect to an axial direction of an optic axis of light that is inputted through the input optical waveguide, transmitted through the first optical waveguide, the connecting optical waveguide and the second optical waveguide and outputted from the output optical waveguide. Further, the first optical attenuating heater and the second optical attenuating heater are arranged so as to produce opposite refractive index distributions in the axial direction of the optic axis of the light that is inputted through the input optical waveguide, transmitted through the first optical waveguide, the connecting optical waveguide and the second optical waveguide and outputted from the output optical waveguide, in the first optical waveguide and the second optical waveguide.

Further, the optical attenuator of claim 2 may be constructed so that the first recess and the first optical attenuating heater and the second recess and the second optical attenuating heater are formed in opposite positional relationships in the axial direction of the optic axis of the light that is inputted through the input optical waveguide, transmitted through the first optical waveguide, the connecting optical waveguide and the second optical waveguide and outputted from the output optical waveguide.

Still further, the optical attenuator of claim 3 may be constructed so that at least either a positional relationship between an optic axis of a light inputted into the first optical waveguide through the input optical waveguide and an optic axis of a light outputted from the first optical waveguide to the connecting optical waveguide, or a positional relationship between an optic axis of a light inputted into the second optical waveguide through the connecting optical waveguide and an optic axis of a light outputted from the second optical waveguide to the output optical waveguide, is out of alignment.

Still further, in the optical attenuator of claim 4, the connecting optical waveguide may be formed, at its part in the vicinity of the first optical waveguide, with an optical waveguide width which is narrower than an optical waveguide width of a connecting optical waveguide's part in the vicinity of the second optical waveguide.

Further, in the optical attenuator of claim 5, the connecting optical waveguide may have a narrowed part arranged in the vicinity of the second optical waveguide to have a narrowed optical waveguide width, or the output optical waveguide may have a narrowed part arranged in the vicinity of the second optical waveguide to have a narrowed optical waveguide width.

Still further, the optical attenuator of claim 6 may be constructed so that: the first recess and the first optical attenuating heater in pairs and the second recess and the second optical attenuating heater in pairs are formed in opposite positional relationships in the axial direction of the optic axis of the light that is inputted through the input optical waveguide, transmitted through the first optical waveguide, the connecting optical waveguide and the second optical waveguide and outputted from the output optical waveguide; the second optical attenuating heater is formed on the second optical diffuse part; and the first recess is arranged on one side of the first optical waveguide closer to the output optical waveguide, while the second recess is arranged on one side of the second optical waveguide closer to the input optical waveguide.

Further, the optical attenuator of claim 7 may be constructed so that: the connecting optical waveguide has a length established to allow the first optical waveguide and the second optical waveguide to get close to each other; and the first optical attenuating heater and the second optical attenuating heater are connected with each other through a connecting part arranged on the connecting optical waveguide.

According to the present invention of claim 8, there is provided an optical attenuator that attenuates light inputted through an input optical waveguide and outputs the light from an output optical waveguide, in which a first optical waveguide connected to the input optical waveguide, a second optical waveguide connected to the output optical waveguide and a connecting optical waveguide connecting the first optical waveguide with the second optical waveguide are connected in series, wherein: the first optical waveguide includes a first diffuse part which is formed so that an optical waveguide width thereof becomes broader as extending from the input optical waveguide toward the connecting optical waveguide; a first attenuating part which is interposed between the first diffuse part and the connecting optical waveguide and also formed so that an optical waveguide width of the first attenuating part becomes narrower as directing toward the connecting optical waveguide; and a first recess which is arranged on one side of the first attenuating part in a width direction of an optical waveguide thereof; the second optical waveguide includes a second diffuse part which is formed so that an optical waveguide width thereof becomes broader as extending from the connecting optical waveguide toward the output optical waveguide; a second attenuating part which is interposed between the second diffuse part and the output optical waveguide and also formed so that an optical waveguide width of the second attenuating part becomes narrower as directing toward the output optical waveguide; and a second recess which is arranged on one side of the second diffuse part in a width direction of an optical waveguide thereof or one side of the second attenuating part in a width direction of an optical waveguide thereof; the optical attenuator further includes an optical attenuating heater shaped so as to cross over the first attenuating part and the second attenuating part; the first recess and the second recess are formed in a positional relationship of opposite directions with respect to an axial direction of an optic axis of light that is inputted through the input optical waveguide, transmitted through the first optical waveguide, the connecting optical waveguide and the second optical waveguide and outputted from the output optical waveguide; the first recess, one end of the optical attenuating heater on the first recess, the second recess and the other end of the optical attenuating heater on the second recess are formed in opposite positional relationships in the axial direction of the optic axis of the light that is inputted through the input optical waveguide, transmitted through the first optical waveguide, the connecting optical waveguide and the second optical waveguide and outputted from the output optical waveguide; and the first recess is arranged on one side of the first optical waveguide closer to the output optical waveguide, while the second recess is arranged on one side of the second optical waveguide closer to the input optical waveguide, whereby the optical attenuating heater is arranged so as to produce opposite refractive index distributions in the axial direction of the optic axis of the light that is inputted through the input optical waveguide, transmitted through the first optical waveguide, the connecting optical waveguide and the second optical waveguide and outputted from the output optical waveguide, in the first optical waveguide and the second optical waveguide.

Further, in the optical attenuator of claim 9, at least either a positional relationship between an optic axis of a light inputted into the first optical waveguide through the input optical waveguide and an optic axis of a light outputted from the first optical waveguide to the connecting optical waveguide, or a positional relationship between an optic axis of a light inputted into the second optical waveguide through the connecting optical waveguide and an optic axis of a light outputted from the second optical waveguide to the output optical waveguide, may be out of alignment.

According to the present invention of claim 10, there is provided an optical attenuator that attenuates light inputted through an input optical waveguide and outputs the light from an output optical waveguide, in which a first optical waveguide connected to the input optical waveguide, a second optical waveguide connected to the output optical waveguide and a connecting optical waveguide connecting the first optical waveguide with the second optical waveguide are connected in series, wherein: the first optical waveguide includes a first diffuse part which is formed so that an optical waveguide width thereof becomes broader as extending from the input optical waveguide toward the second optical waveguide; a first attenuating part which is interposed between the first diffuse part and the second optical waveguide and also formed so that an optical waveguide width of the first attenuating part becomes narrower as directing toward the second optical waveguide, the first attenuating part being connected, on its side opposite to the input optical waveguide, with the second optical waveguide; and a first recess which is arranged on one side of the first attenuating part in a width direction of an optical waveguide thereof; the second optical waveguide includes a second diffuse part which is formed so that an optical waveguide width thereof becomes broader as extending from the first optical waveguide toward the output optical waveguide and which is connected, on its side opposite to the output optical waveguide, with the first optical waveguide; a second attenuating part which is interposed between the second diffuse part and the output optical waveguide and also formed so that an optical waveguide width of the second attenuating part becomes narrower as directing toward the output optical waveguide; and a second recess which is arranged on one side of the second diffuse part in a width direction of an optical waveguide thereof or one side of the second attenuating part in a width direction of an optical waveguide thereof; the optical attenuator further includes an optical attenuating heater shaped so as to cross over the first attenuating part and the second attenuating part; the first recess and the second recess are formed in a positional relationship of opposite directions with respect to an axial direction of an optic axis of light that is inputted through the input optical waveguide, transmitted through the first optical waveguide and the second optical waveguide and outputted from the output optical waveguide; the first recess, one end of the optical attenuating heater on the first recess, the second recess and the other end of the optical attenuating heater on the second recess are formed in opposite positional relationships in the axial direction of the optic axis of the light that is inputted through the input optical waveguide, transmitted through the first optical waveguide, the connecting optical waveguide and the second optical waveguide and outputted from the output optical waveguide; and the first recess is arranged on one side of the first optical waveguide closer to the output optical waveguide, while the second recess is arranged on one side of the second optical waveguide closer to the input optical waveguide, whereby the optical attenuating heater is arranged so as to produce opposite refractive index distributions in the axial direction of the optic axis of the light that is inputted through the input optical waveguide, transmitted through the first optical waveguide and the second optical waveguide and outputted from the output optical waveguide, in the first optical waveguide and the second optical waveguide.

According to the present invention of claim 11, there is also provided an optical attenuator that attenuates light inputted through an input optical waveguide and outputs the light from an output optical waveguide, in which a first optical waveguide connected to the input optical waveguide and a second optical waveguide connected to the output optical waveguide are connected in series, wherein: the first optical waveguide includes a first diffuse part which is formed so that an optical waveguide width thereof becomes broader as extending from the input optical waveguide toward the second optical waveguide; a first attenuating part which is interposed between the first diffuse part and the second optical waveguide and also formed so that an optical waveguide width of the first attenuating part becomes narrower as directing toward the second optical waveguide, the first attenuating part being connected, on its side opposite to the input optical waveguide, with the second optical waveguide; and a first recess which is arranged on one side of the first attenuating part in a width direction of an optical waveguide thereof; a first optical attenuating heater which is arranged on the other side of the first attenuating part having the first recess in a width direction of an optical waveguide of the first attenuating part and also arranged so as to overlap with a part of the first attenuating part in a thickness direction of the first optical waveguide; the second optical waveguide includes a second diffuse part which is formed so that an optical waveguide width thereof becomes broader as extending from the first optical waveguide toward the output optical waveguide, the second diffuse part being connected, on its side opposite to the output optical waveguide, with the first optical waveguide; a second attenuating part which is interposed between the second diffuse part and the output optical waveguide and also formed so that an optical waveguide width of the second attenuating part becomes narrower as directing toward the output optical waveguide; a second recess which is arranged on one side of the second diffuse part in a width direction of an optical waveguide thereof or one side of the second attenuating part in a width direction of an optical waveguide thereof; a second optical attenuating heater which is arranged on the other side of the optical waveguide having the second recess in the width direction and also arranged so as to overlap with a part of the second diffuse part or the second attenuating part in a thickness direction of the second optical waveguide; the first recess and the second recess are formed in a positional relationship of opposite directions with respect to an axial direction of an optic axis of light that is inputted through the input optical waveguide, transmitted through the first optical waveguide and the second optical waveguide and outputted from the output optical waveguide; the first recess and the first optical attenuating heater in pairs and the second recess and the second optical attenuating heater in pairs are formed in opposite positional relationships in the axial direction of the optic axis of the light that is inputted through the input optical waveguide, transmitted through the first optical waveguide, the connecting optical waveguide and the second optical waveguide and outputted from the output optical waveguide, and the first recess is arranged on one side of the first optical waveguide closer to the output optical waveguide, while the second recess is arranged on one side of the second optical waveguide closer to the input optical waveguide, whereby the first optical attenuating heater and the second optical attenuating heater are arranged so as to produce opposite refractive index distributions in the axial direction of the optic axis of the light that is inputted through the input optical waveguide, transmitted through the first optical waveguide and the second optical waveguide and outputted from the output optical waveguide, in the first optical waveguide and the second optical waveguide; and the first optical attenuating heater and the second optical attenuating heater are connected with each other through a connecting part arranged on the connecting optical waveguide.

Further, the optical attenuator of claim 12 may be constructed so that at least either a positional relationship between an optic axis of a light inputted into the first optical waveguide through the input optical waveguide and an optic axis of a light outputted from the first optical waveguide to the second optical waveguide, or a positional relationship between an optic axis of a light inputted into the second optical waveguide through the first optical waveguide and an optic axis of a light outputted from the second optical waveguide to the output optical waveguide, is out of alignment.

Advantageous Effects

According to the optical attenuator of claim 1, since the first recess and the second recess are formed in the positional relationship of opposite directions with respect to the axial direction of the optic axis of light, the resulting optical waveguide configuration allows the light to be attenuated. Additionally, as the light is attenuated under condition that the refractive-index distributions caused by the first optical attenuating heater and the second optical attenuating heater differs from each other in between the first optical waveguide and the second optical waveguide, it is possible to reduce a polarization dependent loss caused by an asymmetric refractive-index distribution. Thus, without utilizing the interference of lights, it is possible to reduce the polarization dependent loss by a thermo-optic effect, accomplishing a desired optical attenuation.

Further, according to the optical attenuator of claim 2, since the first recess/the first optical attenuating heater and the second recess/the second optical attenuating heater are formed in opposite positional relationships in the axial direction of the optic axis of the light that is inputted through the input optical waveguide, transmitted through the first optical waveguide, the connecting optical waveguide and the second optical waveguide and outputted from the output optical waveguide, it is possible to make an attenuation due to the optical waveguide profile and the refractive index distribution symmetrical in the width direction of an optical waveguide. Thus, when activating both of the first optical attenuating heater and the second optical attenuating heater to generate heat, a direction where the refractive index distribution is deflected by the first optical waveguide and the second optical waveguide is reversed to allow a difference in the polarized state to be averaged between the first optical waveguide and the second optical waveguide.

Further, according to the optical attenuator of claim 3, since at least either the positional relationship between the optic axis of the light inputted into the first optical waveguide through the input optical waveguide and the optic axis of the light outputted from the first optical waveguide to the connecting optical waveguide, or the positional relationship between the optic axis of the light inputted into the second optical waveguide through the connecting optical waveguide and the optic axis of the light outputted from the second optical waveguide to the output optical waveguide is out of alignment, it is possible to enhance the attenuating effect for light in comparison with a case of no misalignment.

Further, according to the optical attenuator of claim 4, since the connecting optical waveguide is formed, at its part in the vicinity of the first optical waveguide, with the optical waveguide width which is narrower than the optical waveguide width of the connecting optical waveguide part in the vicinity of the second optical waveguide, it is possible to diffuse light when passing through the narrowed connecting optical waveguide and also possible to diffuse unnecessary light leading to a deterioration of optical signals, suppressing a deterioration of optical signals accompanies with the attenuation of light.

Further, according to the optical attenuator of claim 5, since the connecting optical waveguide have the narrowed part arranged in the vicinity of the second optical waveguide to have a narrowed optical waveguide width, or the output optical waveguide have the narrowed part arranged in the vicinity of the second optical waveguide to have a narrowed optical waveguide width, the narrowed part can diffuse light, whereby it is possible to suppress a deterioration of optical signals accompanies with the attenuation of light.

Further, according to the optical attenuator of claim 6, the first recess/the first optical attenuating heater and the second recess/the second optical attenuating heater are formed in opposite positional relationships in the axial direction of the optic axis of the light that is inputted through the input optical waveguide, transmitted through the first optical waveguide, the connecting optical waveguide and the second optical waveguide and outputted from the output optical waveguide. Further, the first recess is arranged on one side of the output optical waveguide, while the second recess is arranged on one side of the input optical waveguide. Therefore, as the first optical attenuating heater and the second optical attenuating heater can be arranged inversely in the width direction of optical waveguide and also arranged completely symmetrically in the traveling direction of light, it is possible to reduce the polarization dependent loss furthermore.

Further, according to the optical attenuator of claim 7, since the connecting optical waveguide has a length established to allow the first optical waveguide and the second optical waveguide to get close to each other and the first optical attenuating heater and the second optical attenuating heater are connected with each other through the connecting part arranged on the connecting optical waveguide, the connecting optical waveguide interposed between the first optical waveguide and the second optical waveguide is shortened to allow an insertion loss of light to be reduced corresponding to so-shortened optical waveguide.

Further, according to the optical attenuator of claim 8, since the first recess and the second recess are formed in the positional relationship of opposite directions with respect to the axial direction of the optic axis of light, the resulting optical waveguide configuration allows the light to be attenuated. Additionally, as the light is attenuated under condition that the refractive index distributions caused by the optical attenuating heater differs from each other in between the first optical waveguide and the second optical waveguide, it is possible to reduce a polarization dependent loss caused by an asymmetric refractive index distribution. Thus, without utilizing the interference of lights, it is possible to reduce the polarization dependent loss by a thermo-optic effect, accomplishing a desired optical attenuation. Still further, owing to the provision of the optical attenuating heater that is shaped so as to cross over the first optical waveguide and the second optical waveguide, it eliminates the need for arranging an extra-circuit for supplying power, different from a structure equipped with two optical attenuating heaters. Additionally, due to completely-symmetrical arrangement with respect to the traveling direction of light, it is possible to reduce the polarization dependent loss furthermore.

Further, according to the optical attenuator of claim 9, since at least either the positional relationship between the optic axis of the light inputted into the first optical waveguide through the input optical waveguide and the optic axis of the light outputted from the first optical waveguide to the connecting optical waveguide, or the positional relationship between the optic axis of the light inputted into the second optical waveguide through the connecting optical waveguide and the optic axis of the light outputted from the second optical waveguide to the output optical waveguide is out of alignment, it is possible to enhance the attenuating effect for light in comparison with a case of no misalignment.

Further, according to the optical attenuator of claim 10, since the first optical waveguide is connected to the second optical waveguide in series, it is possible to shorten the entire length of the optical attenuator, allowing an insertion loss of light to be reduced. Still further, owing to the provision of the optical attenuating heater that is shaped so as to cross over the first optical waveguide and the second optical waveguide, it eliminates the need for arranging an extra-circuit for supplying power, different from a structure equipped with two optical attenuating heaters. Additionally, due to completely-symmetrical arrangement with respect to the traveling direction of light, it is possible to reduce the polarization dependent loss furthermore.

Further, according to the optical attenuator of claim 11, since the first optical waveguide is connected to the second optical waveguide in series, it is possible to shorten the entire length of the optical attenuator, allowing an insertion loss of light to be reduced. Additionally, due to completely-symmetrical arrangement with respect to the traveling direction of light, it is possible to reduce the polarization dependent loss furthermore.

Further, since the optical attenuator of claim 12 is constructed so that at least either the positional relationship between the optic axis of the light inputted into the first optical waveguide through the input optical waveguide and the optic axis of the light outputted from the first optical waveguide to the second optical waveguide, or the positional relationship between the optic axis of the light inputted into the second optical waveguide through the first optical waveguide and the optic axis of the light outputted from the second optical waveguide to the output optical waveguide, is out of alignment, it is possible to enhance the attenuating effect for light in comparison with a case of no misalignment.

Figure 1:
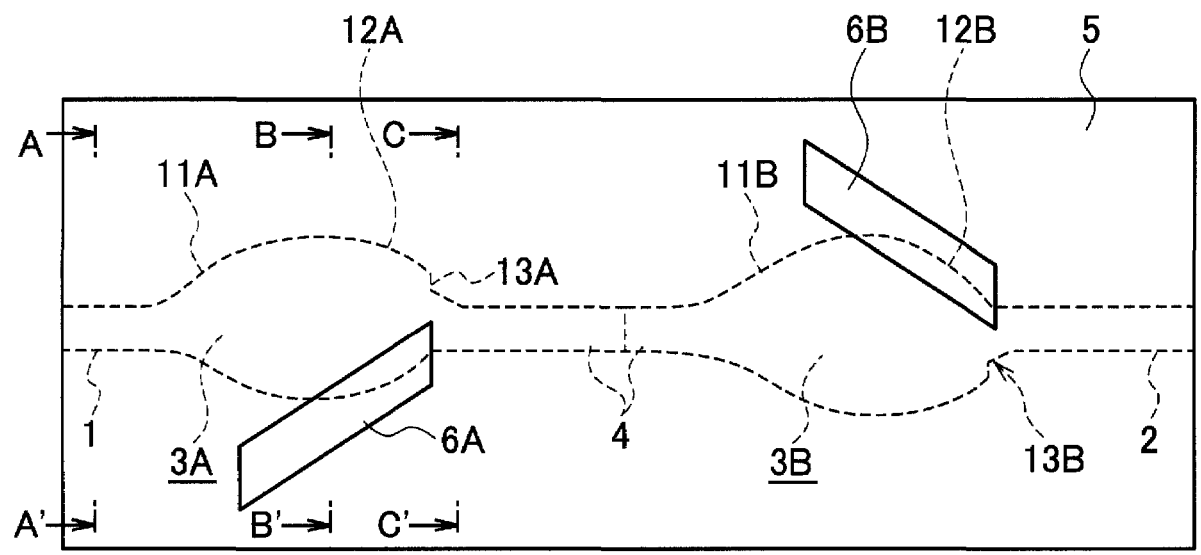
FIG. 1 is views showing a constitution of an optical attenuator on application of the present invention, in which (a) is a plan view, (b) a sectional view taken along a line A-A of (a) and (c) is a sectional view taken along a line B-B of (c).
Figure 1:
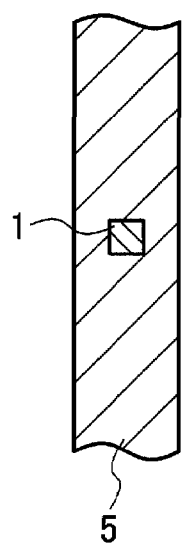
Figure 1:
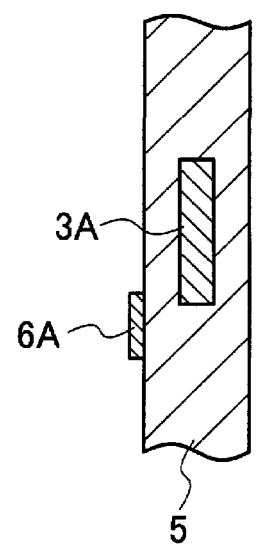

EXPLANATION OF REFERENCE 1 input optical waveguide
2 output optical waveguide
2a narrowed part
3 optical waveguide
3A first optical waveguide
3B second optical waveguide
4 connecting optical waveguide 4a, 4b narrowed parts
5 cladding layer
6 optical attenuating heater
6A first optical attenuating heater
6B second optical attenuating heater
11A first diffuse part
11B second diffuse part
12A first attenuating part
12B second attenuating part
13A first recess
13B second recess
21 connecting part

BEST MODE FOR CARRYING OUT THE INVENTION

Referring to accompanying drawings, embodiments of the present invention will be described below.

The present invention is applied on an optical attenuator, for example, whose plan view is shown in FIG. 1(a) and a sectional view of the optical attenuator is shown in FIG. 1(b). This optical attenuator is used to attenuate optical power with respect to each wavelength for regulation in WDM (Wavelength Division Multiplexing) communication in an optical communication field. When a light having a certain wavelength is inputted, the optical attenuator controls attenuation of the light and subsequently outputs it from an output optical waveguide 2. Note that the optical attenuator of FIG. 1 is nothing but a type of optical attenuator that outputs light upon regulating its optical attenuation, providing one channel of optical power.

This optical attenuator comprises a first optical waveguide 3A on a front stage connected to an input optical waveguide 1, a second optical waveguide 3B of a rear stage connected to an output optical waveguide 2 and a connecting optical waveguide 4 connecting the first optical waveguide 3A with the second optical waveguide 3B, all guides in series connection. The input optical waveguide 1, the first optical waveguide 3A, the connecting optical waveguide 4, the second optical waveguide 3B and the output optical waveguide 2 are formed by respective cores each of which is embedded in a cladding layer 5, as shown in (b), (c) of FIG. 1. As material for the cladding layer 5 and the cores, there may be recommended quartz, polymer exhibiting proper optical characteristic, etc. that is a material whose refractive index is reduced or elevated with application of heat.

The first optical waveguide 3A is formed by a first diffuse part 11A formed so that an optical waveguide width thereof becomes broader as extending from the input optical waveguide 1 toward the connecting optical waveguide 4, a first attenuating part 12A interposed between the first diffuse part 11A and the connecting optical waveguide 4 and also formed so that an optical waveguide width of the part 12A becomes narrower as directing toward the connecting optical waveguide 4 and a first recess 13A arranged on one side of the first attenuating part 12A in a width direction of its optical waveguide. In the optical attenuator, a first optical attenuating heater 6A is formed on the other side of the first attenuating part 12A having the first recess 13A in a width direction of its optical waveguide and also formed on cladding layer 5 so as to overlap with a part of the first attenuating part 12A in a thickness direction of the optical attenuator.

The second optical waveguide 3B is formed by a second diffuse part 11B formed so that an optical waveguide width thereof becomes broader as extending from the connecting optical waveguide 4 toward the output optical waveguide 2, a second attenuating part 12B interposed between the second diffuse part 11B and the output optical waveguide 2 and also formed so that an optical waveguide width of the part 12B becomes narrower as directing toward the output optical waveguide 2 and a second recess 13B arranged on one side of the second diffuse part 11B in a width direction of its optical waveguide or on one side of the second attenuating part 12B in a width direction of its optical waveguide. In the optical attenuator, a second optical attenuating heater 6B is arranged on the other side of the second attenuating part 12B having the second recess 13B in a width direction of its optical waveguide and also formed on cladding layer 5 so as to overlap with a part of either the second diffuse part 11B or the second attenuating part 12B in the thickness direction of the optical attenuator.

In the optical attenuator like this, when inputting light from the input optical waveguide 1, the first optical waveguide 3A diffuses the input light by the first diffuse part 11A and subsequently attenuates the light by the first attenuating part 12A and the first recess 13A and introduces the light into the connecting optical waveguide 4. The light introduced into the connecting optical waveguide 4 is introduced into the second diffuse part 11B of the second optical waveguide 3B. When inputting the light from the connecting optical waveguide 4, the second optical waveguide 3B diffuses the input light by the second diffuse part 11B and subsequently attenuates the light by the second attenuating part 12B and the second recess 13B and introduces the light into the output optical waveguide 2.

A not-shown power supply circuit and a control circuit thereof are connected to the first optical attenuating heater 6A and the second optical attenuating heater 6B. By this control circuit, there are carried out respective controls of starting/ending of heat generation by the first optical attenuating heater 6A and the second optical attenuating heater 6B and regulating of heating power.

Next, the operations of the first optical waveguide 3A and the second optical waveguide 3B will be described with reference to the operation of a single optical waveguide 3 as shown in FIG. 2(a). In the following description, constituents corresponding to the first optical waveguide 3A and the second optical waveguide 3B will be referred to as "optical waveguide 3" simply, constituents corresponding to the first optical attenuating heater 6A and the second optical attenuating heater 6B referred to as "optical attenuating heater 6" simply, constituents corresponding to the first diffuse part 11A and the second diffuse part 11B referred to as "diffuse part 11" simply, and constituents corresponding to the first attenuating part 12A and the second attenuating part 12B will be referred to as "attenuating part 12" simply. Additionally, it is assumed that the core material and the cladding layer 5 adopt material whose refractive index is reduced by applying heat thereon.

When the optical attenuating heater 6 does not generate heat, as shown in FIG. 2(b) being a sectional view taken along line A1-A1, the connecting optical waveguide 4 as the core of the cladding layer 5 has refractive index higher than refractive index of the layer 5 on a section of line B1-B1 of FIG. 2(b) (in a thickness direction of the optical waveguide 3), representing a two-stage refractive index distribution consisting of the core and the cladding layer 5. That is, since the optical attenuating heater 6 does not generate heat, there is no variation of refractive index in the cladding layer 5.

When activating the optical attenuating heater 6 to generate heat, the refractive index distribution of the optical waveguide 3 represents a situation of FIG. 2(c) where the larger a temperature change in a position of the cladding layer 5 in the thickness direction gets since the position is close to the optical attenuating heater 6, the larger the refractive index change gets for a lower refractive index, and where the smaller the temperature change gets since the position is far from the optical attenuating heater 6, the smaller the refractive index change gets for a higher refractive index.

Figure 2:
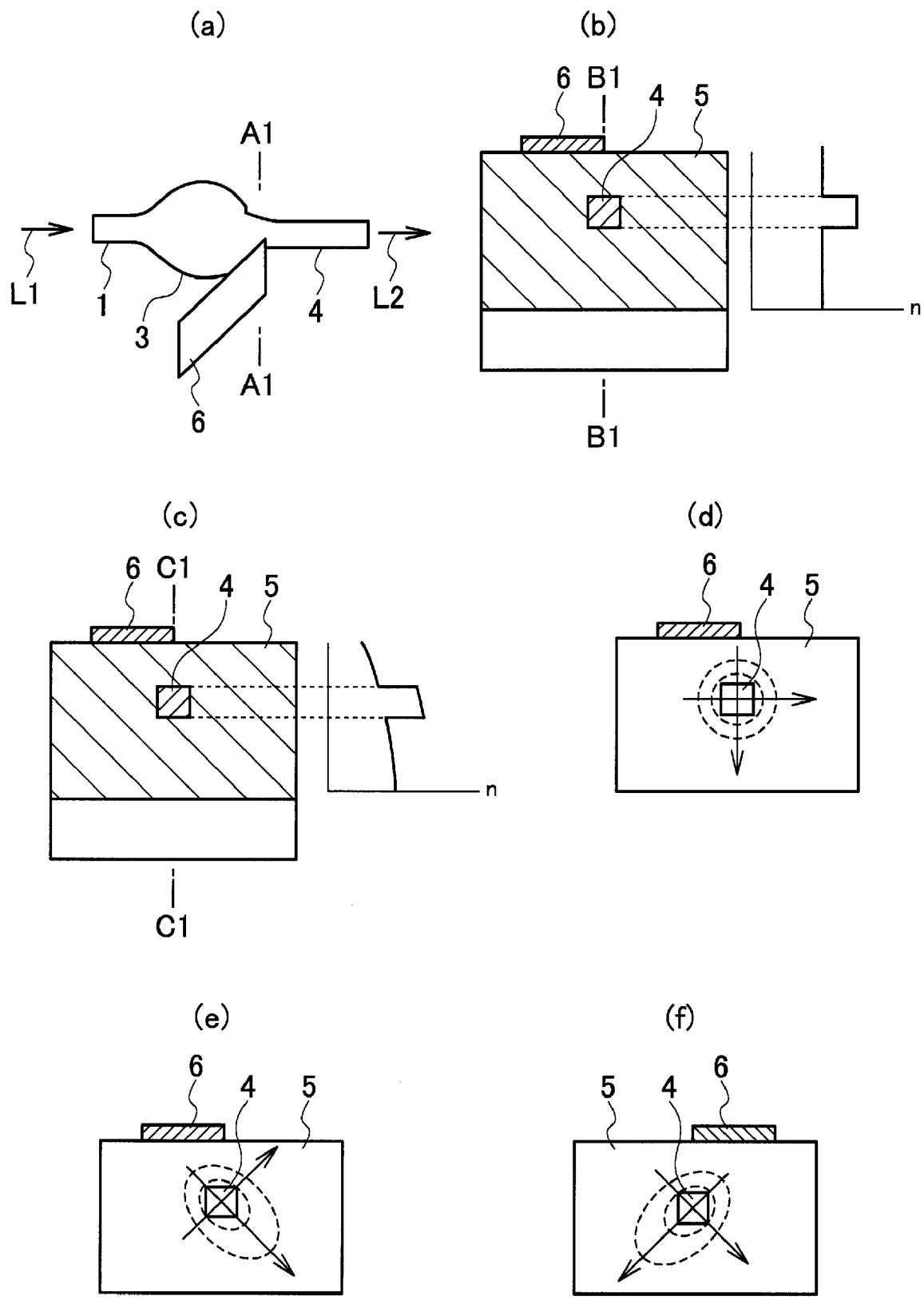
FIG. 2 is views explaining an operation of the optical attenuator on application of the present invention, in which (a) is a plan view of an optical waveguide, (b) a sectional view of the optical waveguide, showing a refractive index distribution thereof when it is unheated, (c) a sectional view of the optical waveguide, showing a refractive index distribution thereof when it is heated, (d) a view showing a field distribution of the optical waveguide when it is unheated and (e), (f) are views showing field distributions of the optical waveguide when it is heated.

In case of the refractive index distribution of FIG. 2(*b*), the field distribution of a light passing through the connecting optical waveguide 4 as the core exhibits a symmetrical distribution about a center part of the connecting optical waveguide 4 as the symmetry center, as shown in FIG. 2(*d*). Under such a situation, a polarization dependent loss is remarkably small (less than 0.1 dB) and is generated due to only the asymmetry postulates in the sectional shape of waveguides of both the diffuse part 11 and the attenuating part 12.

In case of the refractive index distribution of FIG. 2(*c*), the field distribution of a light passing through the connecting optical waveguide 4 as the core is deflected to form an asymmetrical distribution corresponding to the change in the refractive index distribution, as shown in FIG. 2(*e*). Under such a situation, as the refractive index distribution is not symmetrical due to heating, incident light is transmitted while being deflected obliquely, so that the polarization dependent loss grows larger in comparison with that in the unheated state. Further, the refractive index distribution of FIG. 2(*e*) exhibits a distortion extending from upper left to lower right. On the other hand, as shown in FIG. 2(*f*), when the optical attenuating heater 6 is formed in a position shifted to the right side in the figure in comparison with the arrangement of FIG. 2(*e*), the refractive index distribution exhibits a distortion extending from upper right to lower left.

In the optical attenuator of FIG. 1 having the optical waveguide 3 like this, the first optical waveguide 3A and the second optical waveguide 3B are connected with each other in series through the connecting optical waveguide 4. Further, the first recess 13A and the second recess 13B are formed in opposite positions in the axial direction of an optical axis of a light transmitted from the input optical waveguide 1 to the output optical waveguide 2 through the first optical waveguide 3A, the connecting optical waveguide 4 and the second optical waveguide 3B in succession. Still further, the first optical attenuating heater 6A and the second optical attenuating heater 6B are arranged so as to define opposite refractive index distributions in the first optical waveguide 3A and the second optical waveguide 3B respectively, in the axial direction of the optical axis of the light transmitted from the input optical waveguide 1 to the output optical waveguide 2 through the first optical waveguide 3A, the connecting optical waveguide 4 and the second optical waveguide 3B in succession.

Figure 3:
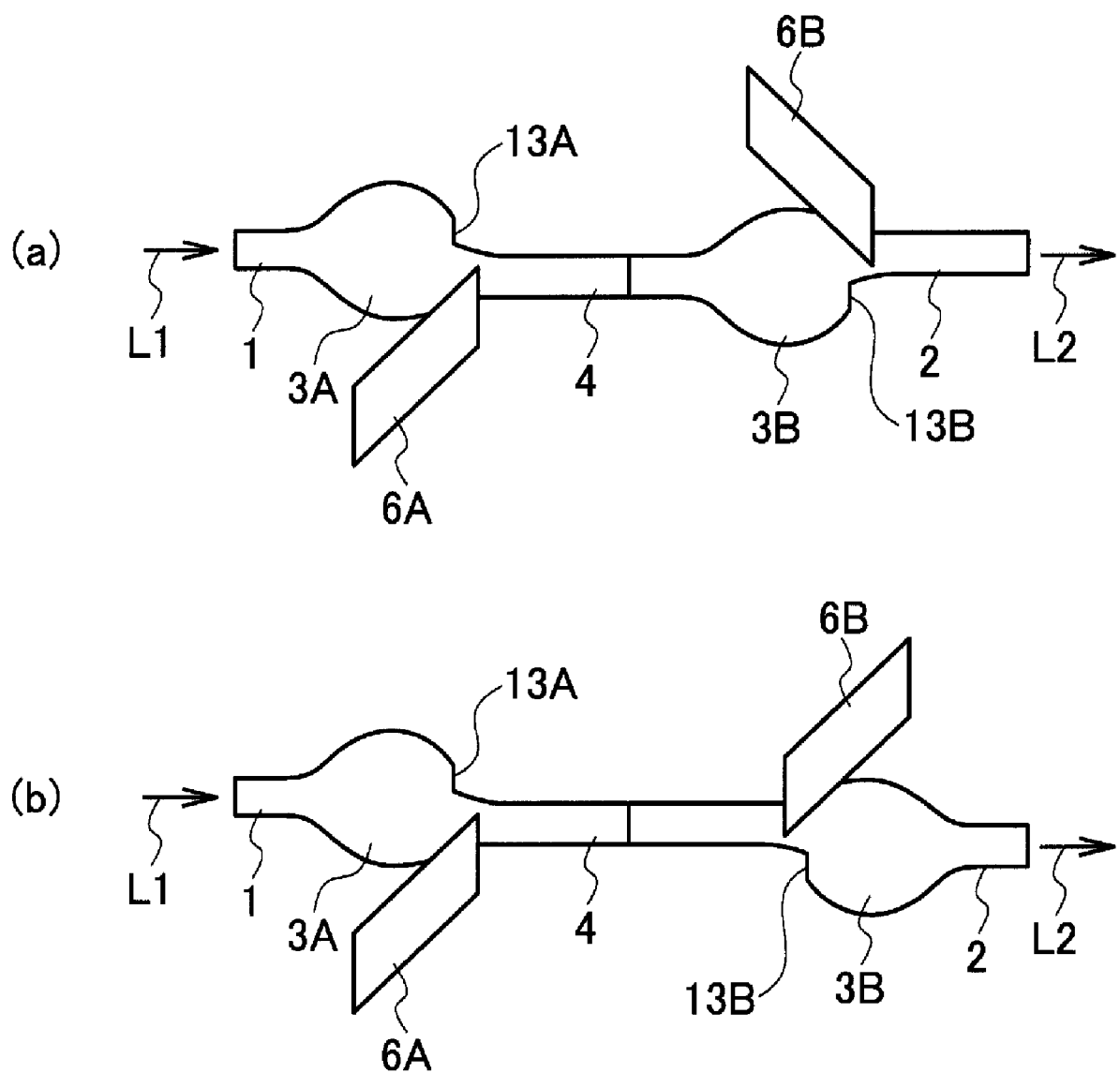
FIG. 3 is plan views respectively showing a constitution of an optical attenuator on application of the present invention.

That is, as shown in FIG. 3(*a*) and FIG. 3(*b*), this optical attenuator has the first optical attenuating heater 6A and the second optical attenuating heater 6B arranged on opposite sides with respect to the central axis of the optical waveguides. Further, a guide profile of the first optical waveguide 3A consisting of the first diffuse part 11A, the first attenuating part 12A and the first recess 13A and a guide profile of the second optical waveguide 3B consisting of the second diffuse part 11B, the second attenuating part 12B and the second recess 13B, are reversed to each other in a vertical direction of the figure (in the width direction of the optical waveguide).

In detail, as shown in FIG. 3(*a*), the first optical attenuating heater 6A and the second optical attenuating heater 6B, the first diffuse part 11A and the second diffuse part 11B, the first attenuating part 12A and the second attenuating part 12B, and the first recess 13A and the second recess 13B are opposed to each other in the width direction of optical waveguide, respectively. With the arrangement, it is possible to make attenuation amounts due to both guide profile and refractive index distribution symmetrical in the width direction of optical waveguide.

In the optical attenuator, alternatively, the second optical waveguide 3B shown in FIG. 3(*b*) may be arranged inversely to the second optical waveguide 3B shown in FIG. 3(*a*) in a fore-and-aft direction (light transmitting direction), so that the second recess 13B faces the first optical waveguide 3A.

Consequently, when activating both of the first optical attenuating heater 6A and the second optical attenuating heater 6B to generate heat, the refractive index distribution is reversed in its distortion direction by the first optical waveguide 3A and the second optical waveguide 3B, so that there is no possibility that a polarization component minimized or maximized in the first optical waveguide 3A coincides with a polarization component minimized or maximized in the second optical waveguide 3B. Thus, it is possible to average a difference in the polarized state between the first optical waveguide 3A and the second optical waveguide 3B.

As for the polarization dependency, it is noted that a maximum or minimum distortion appears in between optic components whose polarized directions are shifted from each other by 90 degrees, as represented by TE polarization and TM polarization of light. Accordingly, it is desirable that the first optical attenuating heater 6A and the second optical attenuating heater 6B are arranged so as to produce refractive index distributions where respective maximum changing directions in the refractive index distributions for the core and cladding layer 5 are shifted from each other by 90 degrees when activating the heaters 6A, 6B to generate heat together.

That is, the second optical attenuating heater 6B is arranged in a manner that if activating e.g. the first optical attenuating heater 6A to generate heat and produce a refractive index distribution as shown in FIG. 2(*c*) and a field distribution as shown in FIG. 2(*e*) in the first optical waveguide 3A, then light in the first optical waveguide 3A is polarized to the lower right in FIG. 2(*e*) or that if activating the second optical attenuating heater 6B to generate heat, then light in the second optical waveguide 3B is polarized to the lower left in FIG. 2(*f*).

In this way, by realizing a refractive index distribution where directions to maximize the polarization dependency are symmetrical, a polarization dependent loss is suppressed.

Thus, according to the optical attenuator on application of the invention, by connecting the first optical waveguide 3A and the second optical waveguide 3B with each other through the connecting optical waveguide 4 in series and further differentiating a heating direction with respect to an optic axis passing through the first optical waveguide 3A from a heating direction with respect to an optic axis passing through the second optical waveguide 3B, it is possible to differentiate the refractive index distribution in the first optical waveguide 3A from that in the second optical waveguide 3B. For instance, it is possible to reduce a polarization dependent loss in comparison with an arrangement where two optical attenuating heaters are arranged upwardly in FIG. 3

Therefore, according to this optical attenuator, light is attenuated by an optical waveguide profile where the first recess 13A and the second recess 13B are formed in the positional relationship in opposite directions in the axial direction of an optic axis of the light. Additionally, the light is attenuated since the first optical attenuating heater 6A and the second optical attenuating heater 6B allow the refractive index distribution in the first optical waveguide 3A to be differentiated from that in the second guide 3B. As a result, it is possible to reduce a polarization dependent loss due to asymmetrical refractive index distribution, whereby a desired optical attenuation can be realized with reduced polarization dependent loss without utilizing interference of lights.

Further, according to this optical attenuator, it is desirable that at least either the positional relationship between the optic axis of a light inputted into the first optical waveguide 3A through the input optical waveguide 1 and the optic axis of a light outputted from the first optical waveguide 3A to the connecting optical waveguide 4 or the positional relationship between the optic axis of a light inputted into the second optical waveguide 3B through the connecting optical waveguide 4 and the optic axis of a light outputted from the second optical waveguide 3B to the output optical waveguide 2 is out of alignment, as shown in FIG. 3.

By shifting the optic axes from each other in this way, it is possible to enhance the attenuation effect of light in comparison with that in case of no misalignment. That is, by shifting the optic axis of the light passing through the connecting optical waveguide 4 from the optic axis of an input light L1 into the input optical waveguide 1 to the opposite side of the first recess 13A (lower side in FIG. 3(a)), it is possible to increase light radiated from the first recess 13A, so that light to be combined in the connecting optical waveguide 4 can be decreased. Otherwise, even when shifting the optic axis of the connecting optical waveguide 4 and the optic axis of the output optical waveguide 2 from each other, it is possible to improve the attenuation effect of an output light L2 outputted from the output optical waveguide 2. Further, by not only shifting the optic axis of the input optical waveguide 1 from the optic axis of the connecting optical waveguide 4 but shifting the optic axis of the connecting optical waveguide 4 from the optic axis of the output optical waveguide 2, it is possible to improve the attenuation effect of light furthermore. In connection, it should be noted that a shift length among the optic axes in the whole optical attenuator has to be established appropriately since a shift length increased too much would not produce an appropriate insertion loss.

In the optical attenuator of FIG. 3(b) which is provided by reversing the vicinity of the second optical waveguide 3B in the optical attenuator of FIG. 3(a), since the first optical attenuating heater 6A and the second optical attenuating heater 6B can be inversed in the width direction of the optical waveguide and also arranged completely symmetrically with respect to a transmitting direction of the light, it is possible to reduce the polarization dependent loss furthermore.

Thus, as the attenuation effect of light can be enhanced by shifting the optic axes inputted/outputted to and from the first optical waveguide 3A or the optic axes inputted/outputted to and from the second optical waveguide 3B, it is possible to reduce power consumption by the first optical attenuating heater 6A and the second optical attenuating heater 6B, accomplishing power saving for the optical attenuator.

In addition, the above-mentioned optical attenuator may be modified so that a part of the connecting optical waveguide 4 in the vicinity of the first optical waveguide 3A has a guide width narrower than that of a part of the optical waveguide 4 in the vicinity of the second optical waveguide 3B. In the connecting optical waveguide 4 of this optical attenuator, as shown in FIG. 4(a), its part connected to the first attenuating part 12A of the first optical waveguide 3A constitutes a narrow part 4a whose width is smaller than a guide width of the input optical waveguide 1. In other words, the optical attenuator has the connecting optical waveguide 4 whose part in the vicinity of the first attenuating part 12A has a thin guide width in comparison with a guide width of a connecting optical waveguide part far from the first attenuating part 12A. Note that FIG. 4(b) shows a form where the second optical waveguide 3B of FIG. 4(a) is reversed in front and in the rear and respectively connected to the first optical waveguide 3A and the output optical waveguide 2.

In this way, since the provision of the narrow part 4a causes an optical waveguide width to be reduced in comparison with the optical waveguide width of the input optical waveguide 1, even if parts of light diffused in the first diffuse part 11A combine with each other again, it is possible to diffuse the light again in passing through the narrow part 4a. Different from the optical attenuator of FIG. 1 or the like that does not include the narrow part 4a, accordingly, it is possible to restrain a deterioration of optical signals accompanied with optical attenuation since the optical attenuator allows unnecessary light leading to the deterioration of optical signals to be diffused outside the narrow part 4a.

Figure 5:
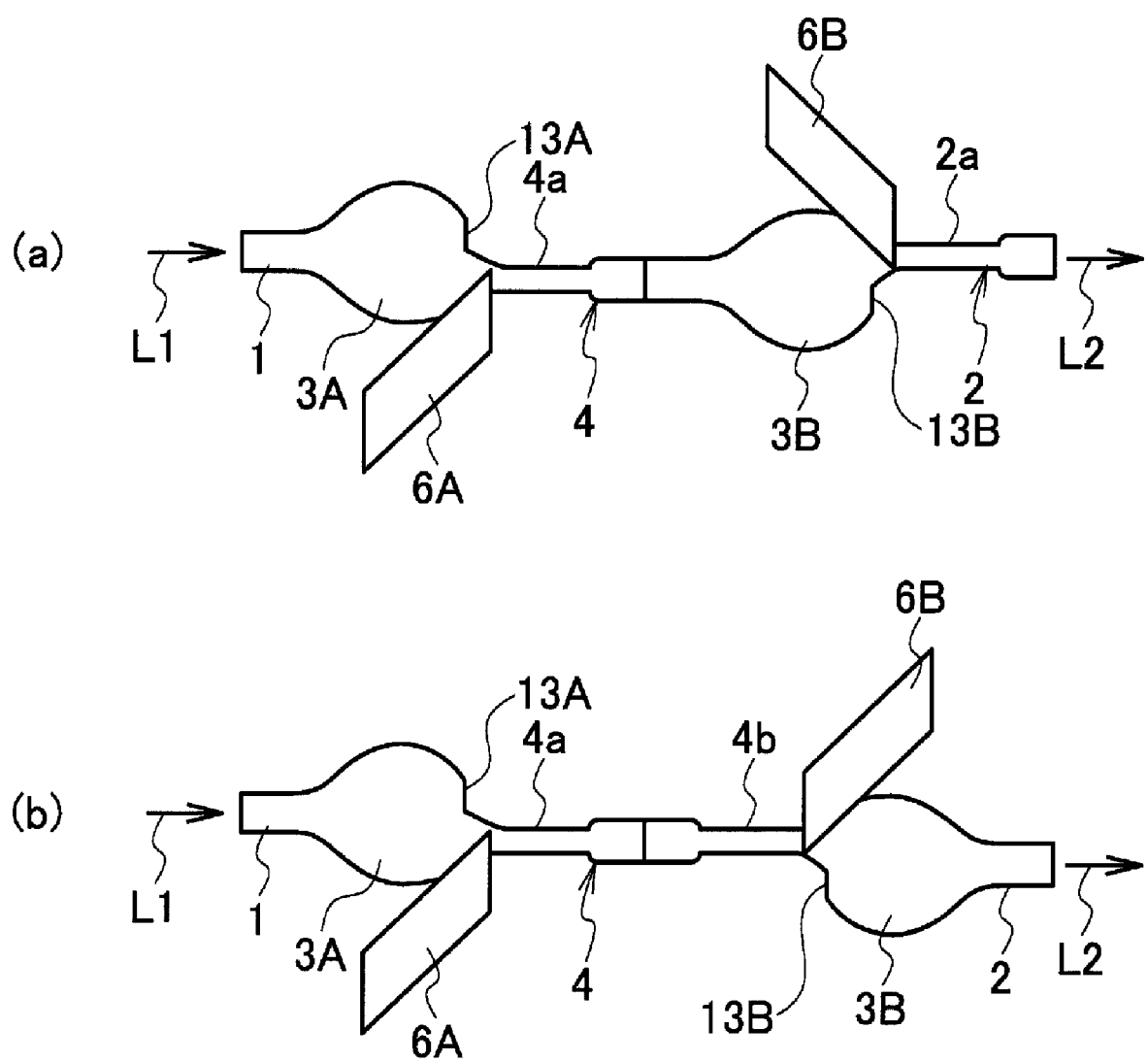
FIG. 5 is plan views respectively showing a constitution of an optical attenuator on application of the present invention where a connecting optical waveguide or an output optical waveguide is narrowed partially.

Additionally, as shown in FIG. 5(a), the above-mentioned optical attenuator may be provided, in the output optical waveguide 2, with a narrow part 2a which is arranged in the vicinity of the second optical waveguide 3B and whose optical waveguide width is reduced. Alternatively, as shown in FIG. 5(b), the optical attenuator may be provided, in the connecting optical waveguide 4, with a narrow part 4b which is arranged in the vicinity of the second optical waveguide 3B and whose optical waveguide width is reduced. In other words, the optical attenuator is provided, near the second diffuse part 11, with either the connecting optical waveguide 4 B or the output optical waveguide 2 whose optical waveguide width is thinned in comparison with the width of an optical waveguide part far from the second diffuse part 11B.

Figure 4:
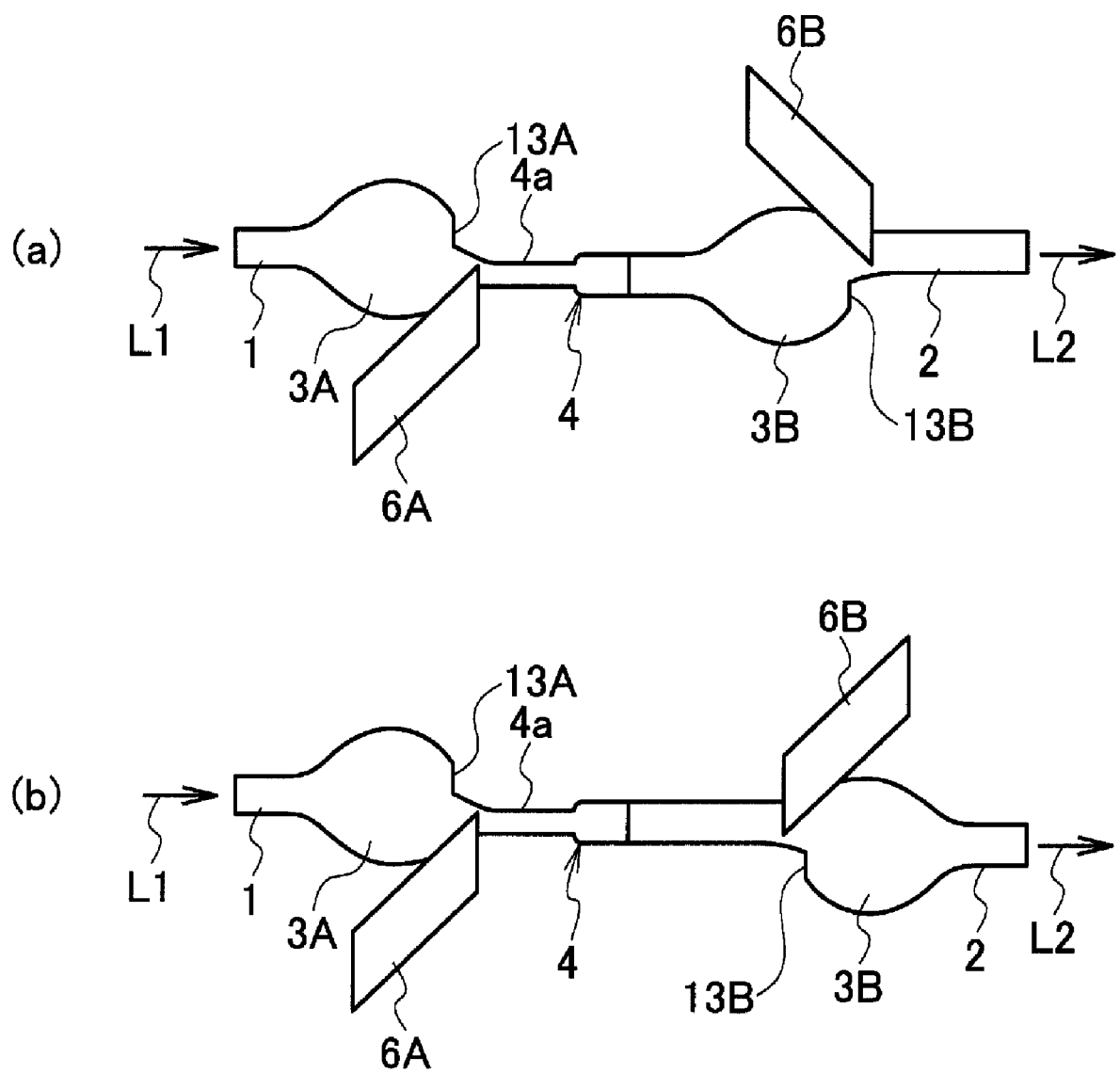
FIG. 4 is plan views respectively showing a constitution of an optical attenuator on application of the present invention where a connecting optical waveguide thereof is narrowed partially.

As similar to the optical attenuator of FIG. 4, the optical attenuator of FIG. 5(a) can diffuse light, which has been diffused in the second diffuse part 11B and subsequently combined with each other in the second attenuating part 12B, by the narrow part 2a, so that it is possible to restrain a deterioration of optical signals accompanied with optical attenuation. As similar to the optical attenuator of FIG. 5(a), the optical attenuator of FIG. 5(b) can restrain the deterioration of optical signals accompanied with optical attenuation although it is provided by reversing the vicinity of the second optical waveguide 3B shown in FIG. 5(a).

Figure 6:
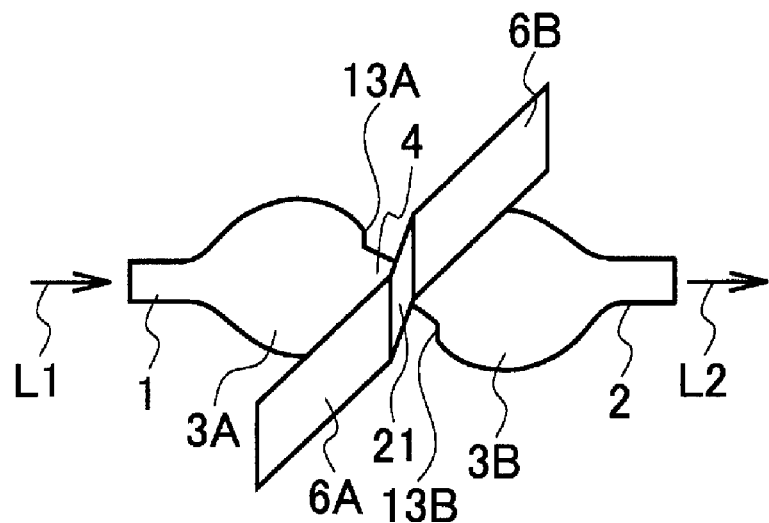
FIG. 6 is a plan view showing a constitution of an optical attenuator on application of the present invention where a connecting optical waveguide is shortened.
Figure 7:
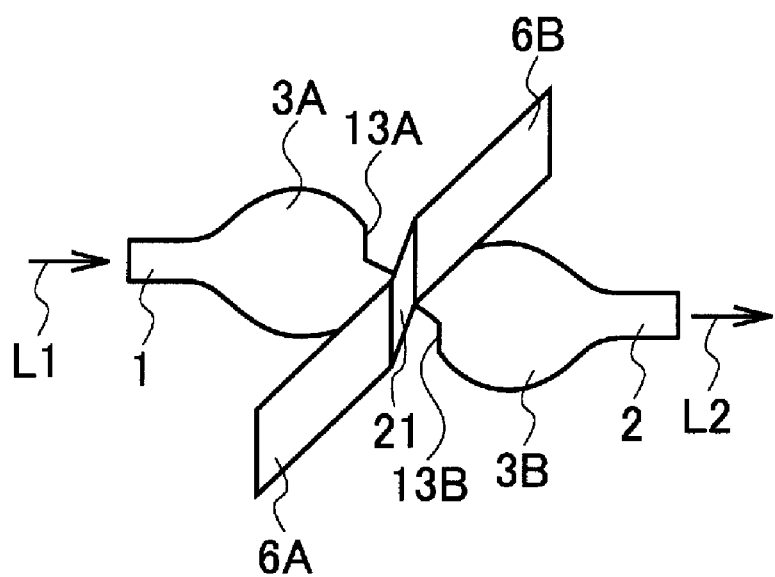
FIG. 7 is a plan view showing a constitution of an optical attenuator on application of the present invention where a connecting optical waveguide is shortened and an optical axis is offset.

Additionally, as shown in FIGS. 6 and 7, the above-mentioned optical attenuator may be formed in a manner that the connecting optical waveguide 4 is shortened so that the first optical waveguide 3A gets close to the second optical waveguide 3B and, the first optical attenuating heater 6A and the second optical attenuating heater 6B both formed on the cladding layer 5 are connected with each other through a connecting part 21. In the constitution where, as shown in FIG. 3(b), the first optical waveguide 3A is provided, on its one side close to the output optical waveguide 2, with the first recess 13A and further, the second optical waveguide 3B is provided, on its one side close to the input optical waveguide 1, with the second recess 13B that faces the first optical waveguide 3A, the optical attenuator of FIG. 6 is provided with the connecting optical waveguide 4 whose length is shortened in comparison with that of FIG. 3(b).

With the arrangement where the first optical waveguide 3A is adjacent to the second optical waveguide 3B, this optical attenuator is capable of reducing an insertion loss of light in the connecting optical waveguide 4 interposed between the first optical waveguide 3A and the second optical waveguide 3B as much as the connecting optical waveguide 4 could be shortened.

In this optical attenuator, if allowing the first optical waveguide 3A to excessively get close to the second optical waveguide 3B in order to reduce the insertion loss, the first optical attenuating heater 6A and the second optical attenuating heater 6B would be laid to overlap each other. Therefore, the connecting part 21 is provided to connect the first optical attenuating heater 6A with the second optical attenuating heater 6B. In the optical attenuator, the connecting part 21 is made from the same heater material as the first optical attenuating heater 6A and the second optical attenuating heater 6B and is formed on the cladding layer 5. Although a heater length is elongated by the connecting part 21 by just that much, it eliminates the need for arranging an extra-circuit for supplying power from the first optical attenuating heater 6A to the second optical attenuating heater 6B.

Figure 8:
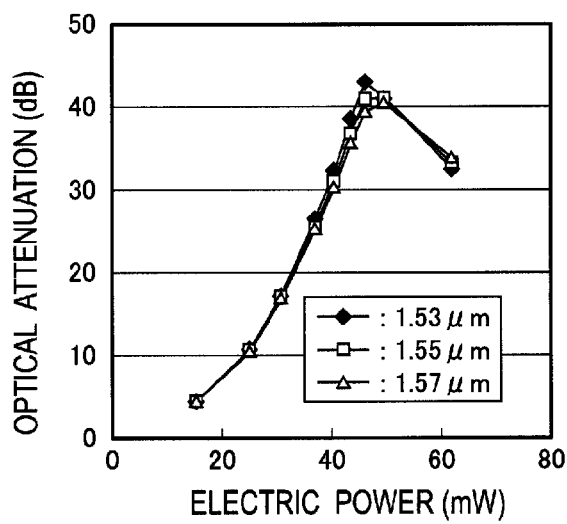
FIG. 8 is diagrams showing simulative results to compare the characteristic of the optical attenuator of FIG. 1 with the characteristic of the optical attenuator of FIG. 6, in which (a) shows a feature between power and attenuation of the optical attenuator of FIG. 1, (b) a feature between power and attenuation of the optical attenuator of FIG. 6 and (c) shows a feature between power and wavelength dependent loss.
Figure 8:
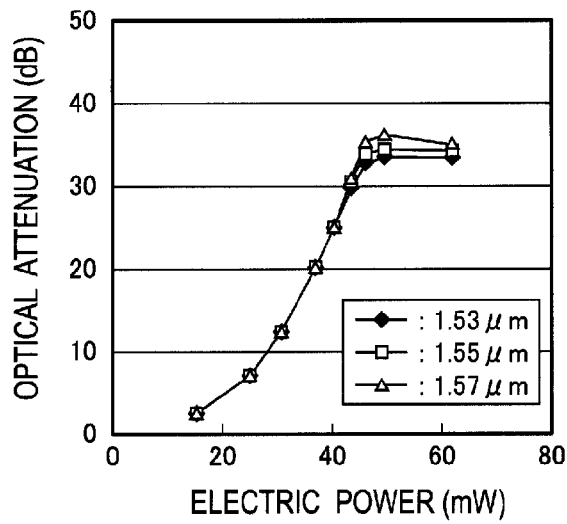
Figure 8:
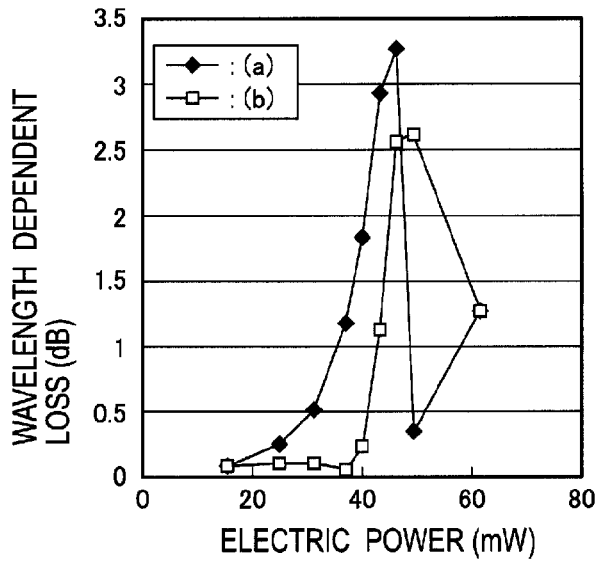

In the optical attenuator of FIG. 6 and the optical attenuator of FIG. 1, if inputting respective input lights L1 of 1530 nm to 1570 nm in wavelength into each optical attenuator through the input optical waveguides 1, there are obtained, as shown in FIGS. 8(a)~8(c), respective results of simulating relationship between attenuation and power supply for the first optical attenuating heater 6A and the second optical attenuating heater 6B.

In FIG. 8(a), the characteristics of attenuation-power supply in case of inputting the input light L1 of 1530 nm in wavelength into the optical attenuator of FIG. 1 is represented by rhombic dots, the characteristics of attenuation-power supply in case of inputting the input light L1 of 1550 nm in wavelength by square dots and the characteristics of attenuation-power supply in case of inputting the input light L1 of 1570 nm in wavelength is represented by triangular dots. In FIG. 8(b), the characteristics of attenuation-power supply in case of inputting the input light L1 of 1530 nm in wavelength into the optical attenuator of FIG. 6 is represented by rhombic dots, the characteristics of attenuation-power supply in case of inputting the input light L1 of 1550 nm in wavelength by square dots and the characteristics of attenuation-power supply in case of inputting the input light L1 of 1570 nm in wavelength is represented by triangular dots. In FIG. 8(c), the relationship between power supply and wavelength dependent loss in the optical attenuator of FIG. 1 is represented by rhombic dots, while the same relationship in the optical attenuator of FIG. 6 is represented by square dots.

From the figures, it will be understood that the optical attenuator of FIG. 6 having the characteristics of FIG. 8(b) exhibits a reduced attenuation change in spite of a variation in the wavelength of the input light L1 in comparison with the optical attenuator of FIG. 1 having the characteristics of FIG. 8(a). That is, as shown in FIG. 8(c), the optical attenuator of FIG. 6 exhibits remarkably small wavelength dependency of the input light L1 in an area of a small power, such as 40 mw. The optical attenuator of FIG. 6 can hold down its wavelength dependency in comparison with the optical attenuator of FIG. 1 where the wavelength dependent loss is increased with the supply of low power for the first optical attenuating heater 6A and the second optical attenuating heater 6B. Therefore, according to the optical attenuator of FIG. 6, it is possible to gain a large attenuation while holding down the wavelength dependency, improving the optical attenuation capability in comparison with the optical attenuator of FIG. 1.

Further, the optical attenuator of FIG. 6 may be modified in a manner that, as shown in FIG. 7, at least either the positional relationship between the optic axis of a light inputted into the first optical waveguide 3A through the input optical waveguide 1 and the optic axis of a light outputted from the first optical waveguide 3A to the connecting optical waveguide 4 or the positional relationship between the optic axis of a light inputted into the second optical waveguide 3B through the connecting optical waveguide 4 and the optic axis of a light outputted from the second optical waveguide 3B to the output optical waveguide 2 is out of alignment.

Thus, owing to the constitution where the optic axes of the first optical waveguide 3A and the second optical waveguide 3B are shifted from each other, it is possible to enhance the optical attenuation in comparison with a constitution having no deviation between optic axes. The reason why the optical attenuation is enhanced is that if the optic axes with the input light L1 and the output light L2 are shifted to the opposite sides of the first recess 13A and the second recess 13B as shown in FIG. 7, an amount of light joined to the output optical waveguide 2 is reduced while an amount of light radiated from the first recess 13A and the second recess 13B are increased.

Note that if adopting a structure of shifting either optic axes for input and output with respect to the first optical waveguide 3A or optic axes for input and output with respect to the second optical waveguide 3B in the above-mentioned arrangement where the first optical waveguide 3A and the second optical waveguide 3B are connected with each other in series, it is possible to accomplish high attenuation. Further, if shifting both of the optic axes, then it is possible to accomplish higher attenuation furthermore. However, if increasing a shift length in the whole optical attenuator too much, then the insertion loss develops a strong tendency to be increased. In this view, it is desirable to establish an appropriate shift length for optic axes.

Figure 9:
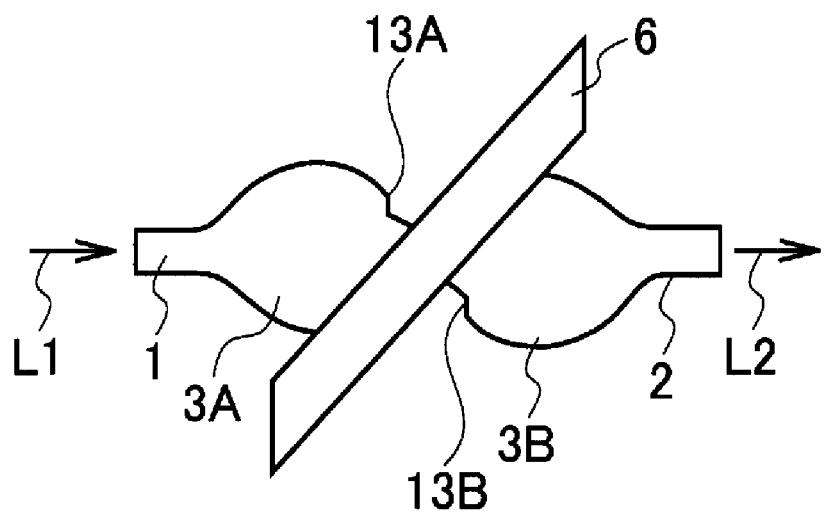
FIG. 9 is a plan view showing a constitution of an optical attenuator on application of the present invention where an optical attenuating heater is formed intersectionally.
Figure 10:
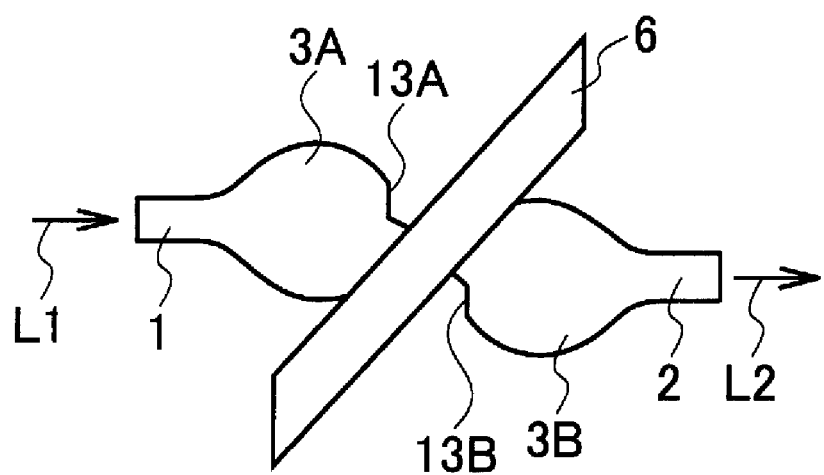
FIG. 10 is a plan view showing a constitution of an optical attenuator on application of the present invention where an optical attenuating heater is formed intersectionally and an optical axis is offset.

Furthermore, as shown in FIGS. 9 and 10, the optical attenuator may be modified in a manner that the first optical waveguide 3A is connected to the second optical waveguide 3B and additionally, an optical attenuating heater 6 crossing over the first optical waveguide 3A and the second optical waveguide 3B is formed on the cladding layer 5. Then, this optical attenuating heater 6 has a combination of the first optical attenuating heater 6A for heating the first optical waveguide 3A and the second optical attenuating heater 6B for heating the second optical waveguide 3B. Although the optical attenuating heater 6 is formed straightly, it may be curved so long as it is formed on the first optical waveguide 3A and the second optical waveguide 3B.

As similar to the optical attenuator of FIG. 6, this optical attenuator is capable of realizing the effects of reducing the insertion loss caused by shortening the whole length of the optical attenuator, eliminating the need for arranging an extra-circuit for supplying power from the first optical attenuating heater 6A to the second optical attenuating heater 6B and reducing the wavelength dependency.

Further, the optical attenuator having the optical attenuating heater 6 formed to cross over the first optical waveguide 3A and the second optical waveguide 3B may be modified in a manner that, as shown in FIG. 10, at least either the positional relationship between the optic axis of a light inputted into the first optical waveguide 3A through the input optical waveguide 1 and the optic axis of a light outputted from the first optical waveguide 3A to the second optical waveguide 3B or the positional relationship between the optic axis of a light inputted into the second optical waveguide 3B through the first optical waveguide 3A and the optic axis of a light outputted from the second optical waveguide 3B to the output optical waveguide 2 is out of alignment. Also in this optical attenuator, it is possible to gain a high attenuation, as similar to the optical attenuator shown in FIG. 7.

Further, this optical attenuator may be modified so as to shorten the connecting optical waveguide 4 and further include a single optical attenuating heater having a configuration to cross over the first optical waveguide 3A and the second optical waveguide 3B. Alternatively, the optical attenuator may be modified so as to connect the first optical waveguide with the second optical waveguide and also connect the first optical attenuating heater 6A with the second optical attenuating heater 6B through the connecting part 21. Also in these modifications, additionally, there may be adopted a structure for shifting the positional relationship of optic axes in the optical attenuator.

It is noted that the above-mentioned embodiment is nothing but one example of the present invention. Thus, the present invention is not limited to only the above-mentioned embodiment. Even in other embodiments, of course, various changes corresponding to designs etc. may be made within the scope of technical idea of the present invention.

Namely, the above-mentioned embodiment is mainly illustrated by way of the arrangement of connecting two optical waveguides in series, as represented by the first optical waveguide 3A and the second optical waveguide 3B. Without being limited to this arrangement only, it is a matter of course that the polarization dependent loss could be suppressed even if three or more optical waveguides are connected with each other in series for the purpose of effecting a desired attenuation.

In the embodiment, the first optical attenuating heater 6A and the first optical attenuating heater 6B are formed straightly. Nevertheless, of course, they may be curved.

INDUSTRIAL APPLICABILITY

The present invention is applicable to an optical attenuator for selecting wavelengths in a wavelength multiplexing communication system.

The invention claimed is:

1. An optical attenuator that attenuates light inputted through an input optical waveguide and outputs the light from an output optical waveguide, comprising:
   a first optical waveguide connected to the input optical waveguide;
   a second optical waveguide connected to the output optical waveguide; and
   a connecting optical waveguide connecting the first optical waveguide with the second optical waveguide are connected in series, wherein
   the first optical waveguide comprises
   a first diffuse part which is formed so that an optical waveguide width thereof becomes broader as extending from the input optical waveguide toward the connecting optical waveguide;
   a first attenuating part which is interposed between the first diffuse part and the connecting optical waveguide and also formed so that an optical waveguide width of the first attenuating part becomes narrower as directing toward the connecting optical waveguide;
   a first recess which is arranged on one side of the first attenuating part in a width direction of an optical waveguide thereof; and
   a first optical attenuating heater which is arranged on the other side of the first attenuating part having the first recess in a width direction of an optical waveguide of the first attenuating part and also arranged so as to overlap with a part of the first attenuating part in a thickness direction of the first optical waveguide;
   the second optical waveguide comprises
   a second diffuse part which is formed so that an optical waveguide width thereof becomes broader as extending from the connecting optical waveguide toward the output optical waveguide;
   a second attenuating part which is interposed between the second diffuse part and the output optical waveguide and also formed so that an optical waveguide width of the second attenuating part becomes narrower as directing toward the output optical waveguide;
   a second recess which is arranged on one side of the second diffuse part in a width direction of an optical waveguide thereof or one side of the second attenuating part in a width direction of an optical waveguide thereof; and
   a second optical attenuating heater which is arranged on the other side of the optical waveguide having the second recess in the width direction and also arranged so as to overlap with a part of the second diffuse part or the second attenuating part in a thickness direction of the second optical waveguide;
   the first recess and the second recess are formed in a positional relationship of opposite directions with respect to an axial direction of an optic axis of light that is inputted through the input optical waveguide, transmitted through the first optical waveguide, the connecting optical waveguide and the second optical waveguide and outputted from the output optical waveguide; and
   the first optical attenuating heater and the second optical attenuating heater are arranged so as to produce opposite refractive index distributions in the axial direction of the optic axis of the light that is inputted through the input optical waveguide, transmitted through the first optical waveguide, the connecting optical waveguide and the second optical waveguide and outputted from the output optical waveguide, in the first optical waveguide and the second optical waveguide.

2. The optical attenuator according to claim 1, wherein the first recess and the first optical attenuating heater and the second recess and the second optical attenuating heater are formed in opposite positional relationships in the axial direction of the optic axis of the light that is inputted through the input optical waveguide, transmitted through the first optical waveguide, the connecting optical waveguide and the second optical waveguide and outputted from the output optical waveguide.

3. The optical attenuator according to claim 1, wherein at least either a positional relationship between an optic axis of a light inputted into the first optical waveguide through the input optical waveguide and an optic axis of a light outputted from the first optical waveguide to the connecting optical waveguide, or a positional relationship between an optic axis of a light inputted into the second optical waveguide through the connecting optical waveguide and an optic axis of a light outputted from the second optical waveguide to the output optical waveguide, is out of alignment.

4. The optical attenuator according to claim 1, wherein the connecting optical waveguide is formed, at its part in the vicinity of the first optical waveguide, with an optical waveguide width which is narrower than an optical waveguide width of a connecting optical waveguide's part in the vicinity of the second optical waveguide.

5. The optical attenuator according to claim 1, wherein the connecting optical waveguide has a narrowed part arranged in the vicinity of the second optical waveguide to have a narrowed optical waveguide width, or the output optical waveguide has a narrowed part arranged in the vicinity of the second optical waveguide to have a narrowed optical waveguide width.

6. The optical attenuator according to claim 1, wherein the first recess and the first optical attenuating heater in pairs and the second recess and the second optical attenuating heater in pairs are formed in opposite positional relationships in the axial direction of the optic axis of the light that is inputted through the input optical waveguide, transmitted through the first optical waveguide, the connecting optical waveguide and the second optical waveguide and outputted from the output optical waveguide;

the second optical attenuating heater is formed on the second optical diffuse part; and the first recess is arranged on one side of the first optical waveguide closer to the output optical waveguide, while the second recess is arranged on one side of the second optical waveguide closer to the input optical waveguide.

7. The optical attenuator according to claim 6, wherein the connecting optical waveguide has a length established to allow the first optical waveguide and the second optical waveguide to get close to each other; and the first optical attenuating heater and the second optical attenuating heater are connected with each other through a connecting part arranged on the connecting optical waveguide.

8. The optical attenuator according to claim 7, wherein at least either a positional relationship between an optic axis of a light inputted into the first optical waveguide though the input optical waveguide and an optic axis of a light outputted from the first optical waveguide to the connecting optical waveguide, or a positional relationship between an optic axis of a light inputted into the second optical waveguide though the connecting optical waveguide and an optic axis of a light outputted from the second optical waveguide to the output optical waveguide, is out of alignment.

9. An optical attenuator that attenuates light inputted through an input optical waveguide and outputs the light from an output optical waveguide, comprising:

a first optical waveguide connected to the input optical waveguide;

a second optical waveguide connected to the output optical waveguide; and a connecting optical waveguide connecting the first optical waveguide with the second optical waveguide are connected in series, wherein:

the first optical waveguide comprises a first diffuse part which is formed so that an optical waveguide width thereof becomes broader as extending from the input optical waveguide toward the connecting optical waveguide;

a first attenuating part which is interposed between the first diffuse part and the connecting optical waveguide and also formed so that an optical waveguide width of the first attenuating part becomes narrower as directing toward the connecting optical waveguide; and a first recess which is arranged on one side of the first attenuating part in a width direction of an optical waveguide thereof;

the second optical waveguide comprises a second diffuse part which is formed so that an optical waveguide width thereof becomes broader as extending from the connecting optical waveguide toward the output optical waveguide;

a second attenuating part which is interposed between the second diffuse part and the output optical waveguide and also formed so that an optical waveguide width of the second attenuating part becomes narrower as directing toward the output optical waveguide; and a second recess which is arranged on one side of the second diffuse part in a width direction of an optical waveguide thereof or one side of the second attenuating part in a width direction of an optical waveguide thereof;

the optical attenuator further includes an optical attenuating heater shaped so as to cross over the first attenuating part and the second attenuating part;

the first recess and the second recess are formed in a positional relationship of opposite directions with respect to an axial direction of an optic axis of light that is inputted through the input optical waveguide, transmitted through the first optical waveguide, the connecting optical waveguide and the second optical waveguide and outputted from the output optical waveguide;

the first recess, one end of the optical attenuating heater on the first recess, the second recess and the other end of the optical attenuating heater on the second recess are formed in opposite positional relationships in the axial direction of the optic axis of the light that is inputted through the input optical waveguide, transmitted though the first optical waveguide, the connecting optical waveguide and the second optical waveguide and outputted from the output optical waveguide; and the first recess is arranged on one side of the first optical waveguide closer to the output optical waveguide, while the second recess is arranged on one side of the second optical waveguide closer to the input optical waveguide, whereby the optical attenuating heater is arranged so as to produce opposite refractive index distributions in the axial direction of the optic axis of the light that is inputted through the input optical waveguide, transmitted though the first optical waveguide, the connecting optical waveguide and the second optical waveguide and outputted from the output optical waveguide, in the first optical waveguide and the second optical waveguide.

10. An optical attenuator that attenuates light inputted through an input optical waveguide and outputs the light from an output optical waveguide; comprising:

a first optical waveguide connected to the input optical waveguide;

a second optical waveguide connected to the output optical waveguide; and a connecting optical waveguide connecting the first optical waveguide with the second optical waveguide are connected in series, wherein:

the first optical waveguide comprises a first diffuse part which is formed so that an optical waveguide width thereof becomes broader as extending from the input optical waveguide toward the second optical waveguide;

a first attenuating part which is interposed between the first diffuse part and the second optical waveguide and also formed so that an optical waveguide width of the first attenuating part becomes narrower as directing toward the second optical waveguide, the first attenuating part being connected, on its side opposite to the input optical waveguide, with the second optical waveguide; and a first recess which is arranged on one side of the first attenuating part in a width direction of an optical waveguide thereof;

the second optical waveguide comprises a second diffuse part which is formed so that an optical waveguide width thereof becomes broader as extending from the first optical waveguide toward the output optical waveguide and which is connected, on its side opposite to the output optical waveguide, with the first optical waveguide;

a second attenuating part which is interposed between the second diffuse part and the output optical waveguide and also formed so that an optical waveguide width of the second attenuating part becomes narrower as directing toward the output optical waveguide; and a second recess which is arranged on one side of the second diffuse part in a width direction of an optical waveguide thereof or one side of the second attenuating part in a width direction of an optical waveguide thereof;

the optical attenuator further includes an optical attenuating heater shaped so as to cross over the first attenuating part and the second attenuating part;

the first recess and the second recess are formed in a positional relationship of opposite directions with respect to an axial direction of an optic axis of light that is inputted through the input optical waveguide, transmitted through the first optical waveguide and the second optical waveguide and outputted from the output optical waveguide;

the first recess, one end of the optical attenuating heater on the first recess, the second recess and the other end of the optical attenuating heater on the second recess are formed in opposite positional relationships in the axial direction of the optic axis of the light that is inputted through the input optical waveguide, transmitted through the first optical waveguide, and the second optical waveguide and outputted from the output optical waveguide; and the first recess is arranged on one side of the first optical waveguide closer to the output optical waveguide, while the second recess is arranged on one side of the second optical waveguide closer to the input optical waveguide, whereby the optical attenuating heater is arranged so as to produce opposite refractive index distributions in the axial direction of the optic axis of the light that is inputted through the input optical waveguide, transmitted through the first optical waveguide and the second optical waveguide and outputted from the output optical waveguide, in the first optical waveguide and the second optical waveguide.

11. The optical attenuator according to claim 10, wherein at least either a positional relationship between an optic axis of a light inputted into the first optical waveguide through the input optical waveguide and an optic axis of a light outputted from the first optical waveguide to the second optical waveguide, or a positional relationship between an optic axis of a light inputted into the second optical waveguide through the first optical waveguide and an optic axis of a light outputted from the second optical waveguide to the output optical waveguide, is out of alignment.

12. An optical attenuator that attenuates light inputted through an input optical waveguide and outputs the light from an output optical waveguide; comprising:

a first optical waveguide connected to the input optical waveguide; and a second optical waveguide connected to the output optical waveguide are connected in series, wherein:

the first optical waveguide comprises a first diffuse part which is formed so that an optical waveguide width thereof becomes broader as extending from the input optical waveguide toward the second optical waveguide;

a first attenuating part which is interposed between the first diffuse part and the second optical waveguide and also formed so that an optical waveguide width of the first attenuating part becomes narrower as directing toward the second optical waveguide, the first attenuating part being connected, on its side opposite to the input optical waveguide, with the second optical waveguide; and a first recess which is arranged on one side of the first attenuating part in a width direction of an optical waveguide thereof;

a first optical attenuating heater which is arranged on the other side of the first attenuating part having the first recess in a width direction of an optical waveguide of the first attenuating part and also arranged so as to overlap with a part of the first attenuating part in a thickness direction of the first optical waveguide;

the second optical waveguide comprises a second diffuse part which is formed so that an optical waveguide width thereof becomes broader as extending from the first optical waveguide toward the output optical waveguide, the second diffuse part being connected, on its side opposite to the output optical waveguide, with the first optical waveguide;

a second attenuating part which is interposed between the second diffuse part and the output optical waveguide and also formed so that an optical waveguide width of the second attenuating part becomes narrower as directing toward the output optical waveguide;

a second recess which is arranged on one side of the second diffuse part in a width direction of an optical waveguide thereof or one side of the second attenuating part in a width direction of an optical waveguide thereof;

a second optical attenuating heater which is arranged on the other side of the optical waveguide having the second recess in the width direction and also arranged so as to overlap with a part of the second diffuse part or the second attenuating part in a thickness direction of the second optical waveguide;

the first recess and the second recess are formed in a positional relationship of opposite directions with respect to an axial direction of an optic axis of light that is inputted through the input optical waveguide, transmitted through the first optical waveguide and the second optical waveguide and outputted from the output optical waveguide;

the first recess and the first optical attenuating heater in pairs and the second recess and the second optical attenuating heater in pairs are formed in opposite positional relationships in the axial direction of the optic axis of the light that is inputted through the input optical waveguide, transmitted through the first optical waveguide, and the second optical waveguide and outputted from the output optical waveguide, and the first recess is arranged on one side of the first optical waveguide closer to the output optical waveguide, while the second recess is arranged on one side of the second optical waveguide closer to the input optical waveguide, whereby the first optical attenuating heater and the second optical attenuating heater are arranged so as to produce opposite refractive index distributions in the axial direction of the optic axis of the light that is inputted through the input optical waveguide, transmitted through the first optical waveguide and the second optical waveguide and outputted from the output optical waveguide, in the first optical waveguide and the second optical waveguide; and the first optical attenuating heater and the second optical attenuating heater are connected with each other through a connecting part arranged on the connecting optical waveguide.

* * * * *